United States Patent [19]
Ooenoki

[11] Patent Number: 5,488,470
[45] Date of Patent: Jan. 30, 1996

[54] BENDING ANGLE DETECTOR FOR USE IN A BENDING MACHINE

[75] Inventor: Toshiyuki Ooenoki, Hirakata, Japan

[73] Assignee: Kabushiki Kaisha Komatsu Seisakusho, Tokyo, Japan

[21] Appl. No.: 256,083

[22] PCT Filed: Oct. 25, 1993

[86] PCT No.: PCT/JP93/01538

§ 371 Date: Jun. 29, 1994

§ 102(e) Date: Jun. 29, 1994

[87] PCT Pub. No.: WO94/11701

PCT Pub. Date: May 26, 1994

[30] Foreign Application Priority Data

Nov. 10, 1992 [JP] Japan .................... 4-300112

[51] Int. Cl.$^6$ .................... G01B 11/26; G01C 1/00; G06F 15/46; B21C 51/00
[52] U.S. Cl. ................. 356/138; 356/139.03; 356/152.1; 364/474.07; 72/37
[58] Field of Search .................... 356/375, 138, 356/152.1, 139.03; 72/37, 10, 12, 31, 34; 364/474.07; 348/140

[56] References Cited

U.S. PATENT DOCUMENTS

| | | | |
|---|---|---|---|
| 4,564,765 | 1/1986 | Blaich | 72/37 |
| 4,672,562 | 6/1987 | Egli et al. | 348/140 |
| 4,672,564 | 6/1987 | Egli et al. | 348/140 |
| 5,298,977 | 3/1994 | Shintani et al. | 356/375 |
| 5,329,597 | 7/1994 | Kouno et al. | 364/474.07 |
| 5,367,902 | 11/1994 | Kitabayashi et al. | 72/37 |

FOREIGN PATENT DOCUMENTS

| | | |
|---|---|---|
| 59-174221 | 10/1984 | Japan . |
| 63-314403 | 12/1988 | Japan .................... 356/152.2 |
| 3259705 | 11/1991 | Japan . |
| 4-86958 | 3/1992 | Japan . |
| 54-76179 | 6/1994 | Japan . |

Primary Examiner—Frank Gonzalez
Assistant Examiner—Jason D. Eisenberg
Attorney, Agent, or Firm—Nikaido, Marmelstein Murray & Oram

[57] ABSTRACT

A bending angle detector for use in a bending machine, capable of detecting a bending angle of a workpiece with high accuracy even if workpieces of different materials are bent by the bending machine. The detector detects a bending angle in such a way that a coordinate transformation parameter is obtained from the image of each point of a virtual cubic lattice formed in space, the parameter being used for transformation between a space coordinate system in which each axis of the cubic lattice is set as a reference axis and a plane coordinate system which represents an image plane of the photographing means; a linear equation, which represents in the space coordinate system, each spot light projected on an outer face of the bent workpiece, is obtained; the space coordinates of three bright points, which are formed on the outer faces of the bent workpiece projecting three spot lights by three projectors, are obtained from the coordinate transformation parameter and the linear equation for each spot light, whereby a planar equation representing the three bright points is determined. The three spot lights may be replaced by two slit lights.

6 Claims, 9 Drawing Sheets

BENDING ANGLE DETECTOR FOR USE IN A BENDING MACHINE

FIELD OF THE INVENTION

The present invention relates to a bending angle detector for use in a bending machine that detects a specified angle at which a sheet-like workpiece is bent by an upper bender and lower bender.

BACKGROUND ART

There are known bending machines such as press-brakes in which a sheet-like workpiece is bent in such a way that information, such as the thickness and material of the workpiece and a target bending angle, is input in an NC device; the amount of lowering an upper bender (punch) is calculated based on the input information; and lowering of the upper bender is controlled according to the calculated value, whereby a desired product is produced.

In spite of controlling the amount of lowering the upper bender by the use of the NC device as described above, the bending machines often fail in bending a workpiece at a desired angle, because of variations in the characteristics of materials themselves such as thickness, Young's modulus and n-value as well as various bending conditions. One attempt that has been made to solve the above problem is that trial is carried out by manual control of the upper bender prior to real bending in order to determine a control amount for lowering the upper bender and the control amount thus determined is input in the NC device. However, such a fine adjustment of the amount of lowering the upper bender has to be carried out each time a material lot is changed, and it is therefore very troublesome.

In order to achieve high-accuracy bending by eliminating bending angle errors caused by the above-mentioned variations in the characteristics of materials etc., the following solutions have been proposed.

(i) The characteristics of a material are obtained from "load-displacement data" which can be obtained in the course of bending. From these characteristics, an angle at which the material is bent is predicted.

(ii) An angle at which a workpiece is bent is directly detected in the course of bending.

The first method, in which a bending angle is predicted from "load-displacement data" obtained during bending, includes approximation in the process of calculation, because most of the calculation is performed based on the theory of simple bending. Therefore, a satisfactorily accurate result cannot be expected and in fact, the above method has not come into practice yet.

In contrast with the first one, the second method in which the bending angle of a workpiece is directly detected in the course of bending is easy to carry out since a workpiece, i.e., the object to be controlled itself is directly measured and therefore has high feasibility.

Conventionally, there are two types of detecting mechanisms for detecting an angle at which a workpiece is bent. One is the contact-type and the other is the non-contact type.

As one example of the contact-type detecting mechanism, a continuous follow-up angle detector is disclosed in Japanese Patent. Publication Laid Open No. 273618 (1989). In this detector, a rectangular link is utilized and the inclination of a probe being in contact with the inclined surface of a metal sheet (workpiece) is read by an encoder provided in the link mechanism, thereby detecting an angle at which the metal sheet is bent.

As the non-contact detecting mechanism, there is generally known a method in which a plurality of distance sensors are employed for measuring the distance from each sensor to the bent part of a workpiece and the difference between the distances measured is obtained, whereby the bending angle of a workpiece is detected. One example of such a detecting mechanism is disclosed in Japanese Patent Publication Laid Open No. 49327 (1988), in which overcurrent sensors are employed as the distance sensors. Another example is disclosed in Japanese Patent Publication Laid Open No. 2723 (1989) in which electrostatic capacity sensors are employed as the distance sensors. Also, Japanese Patent Publication Laid Open No. 271013 (1989) and West German Patent No. 3216053 disclose the non-contact type detectors in which optical sensors are used as the distance sensors.

However, the above conventional bending angle detecting mechanisms present the following problems.

Firstly, the contact-type detecting mechanisms cannot be suitably used when bending a workpiece with short legs, as they require comparatively long legs to ensure a high measuring accuracy. Further, if the contact-type mechanisms are used for long time, long contact with workpieces causes the probe to be worn and deformed, resulting in a decreased measuring accuracy.

In the non-contact type detecting mechanisms, a plurality of distance sensors are employed for measuring and calculating the distance from each sensor to a bent workpiece, but a long distance cannot be kept between one sensor to another so that a satisfactory detecting accuracy cannot be obtained. Further, the non-contact type mechanisms including overcurrent sensors or electrostatic capacity sensors have the disadvantage that since the outputs from the sensors vary depending on the material of a workpiece, measuring conditions have to be changed each time a different material is used. The non-contact type mechanisms including optical sensors also have the disadvantage that light directed to the surface of a workpiece disperses in some surface conditions, which leads to increased measuring errors and a decreased measuring accuracy. Another disadvantage of the above type is that the measuring accuracy is dependent on sensors to be used and the resolving power of the image receptor.

SUMMARY OF THE INVENTION

The present invention has been made to overcome the foregoing problems and therefore one of the objects of the invention is to provide a bending angle detector provided in a bending machine which is capable of detecting an angle at which a workpiece is bent with high accuracy in the course of bending even if different kinds of materials are used.

In order to accomplish the above object, there is provided, according to the invention, a bending angle detector for use in a bending machine in which a sheet-like workpiece is bent at a specified angle by means of an upper bender and a lower bender, the detector comprising:

(a) projector means for projecting spot lights onto an object to be photographed thereby forming bright points on the surface thereof;

(b) photographing means for photographing the object to be photographed on the surface of which bright points are formed by the projector means;

(c) coordinate transformation parameter calculating means for forming a virtual cubic lattice in space by moving, at a specified pitch, a lattice pattern which is formed by arranging a number of reference positions in the pattern of a lattice on the surface of the object to be photographed, and for calculating a coordinate transformation parameter from a plurality of images obtained by photographing each point of the cubic lattice, the parameter being used for transformation between a space coordinate system in which each axis of the cubic lattice is set as a reference axis and a plane coordinate system which represents an image plane of the photographing means;

(d) linear equation calculating means for calculating a linear equation representing, in the space coordinate system, each spot light projected by the projector means from the positions of at least two bright points formed in the lattice patterns of the cubic lattice;

(e) coordinate value transforming means for photographing the bent workpiece on the outer faces of which at least three bright points are formed by projecting at least three spot lights thereon by means of the projector means and for transforming the coordinate values of each photographed bright point in the plane coordinate system to those of the space coordinate system by the use of the coordinate transformation parameter calculating means and the linear equation calculating means; and (f) bending angle calculating means for calculating a planar equation representing the three bright points from the coordinate values of the three bright points which have been transformed to the space coordinate system by the coordinate value transforming means, thereby obtaining an angle at which the workpiece is bent.

In the bending angle detector for use in a bending machine according to the first aspect of the invention, the lattice pattern on the surface of which a number of reference positions are arranged is first moved at a specified pitch in order to form a virtual cubic lattice in space, and then a plurality of images are obtained by photographing each point of the cubic lattice. From a plurality of images thus obtained, a coordinate transformation parameter, which is used for transforming from the space coordinate system in which each axis of the cubic lattice is set as a reference axis to the plane coordinate system representing an image plane of the photographing means, is obtained. Then, a linear equation in the space coordinate system, which represents each of the spot lights which are projected by the projector means, is obtained from the positions of at least two bright points formed in the lattice patterns of the cubic lattice. With the coordinate transformation parameter and the linear equation representing a spot light, the space coordinate values of a bright point formed at a desired position in the virtual cubic lattice can be unitarily determined. Therefore, by projecting at least three spot lights onto the outer faces of the bent workpiece, the coordinates of the three bright points in the space coordinate system can be obtained by calculation and a planar equation representing the three bright points, that is, an angle at which the workpiece is bent can be obtained.

According to another aspect of the invention, there is provided a bending angle detector for use in a bending machine in which a sheet-like workpiece is bent at a specified angle by means of an upper bender and a lower bender, the detector comprising:

(a) projector means for projecting slit lights onto an object to be photographed thereby forming bright lines on the surface thereof;

(b) photographing means for photographing the object to be photographed on the surface of which bright lines are formed by the projector means;

(c) coordinate transformation parameter calculating means for forming a virtual cubic lattice in space by moving, at a specified pitch, a lattice pattern which is formed by arranging a number of reference positions in the pattern of a lattice on the surface of the object to be photographed, and for calculating a coordinate transformation parameter from a plurality of images obtained by photographing each point of the cubic lattice, the parameter being used for transformation between a space coordinate system in which each axis of the cubic lattice is set as a reference axis and a plane coordinate system which represents an image plane of the photographing means;

(d) planar equation calculating means for calculating a planar equation representing, in the space coordinate system, each slit light projected by the projector means from the positions of at least two bright lines formed in the lattice patterns of the cubic lattice;

(e) coordinate value transforming means for photographing the bent workpiece on the outer faces of which at least two bright lines are formed by projecting at least two slit lights thereon by means of the projector means and for transforming a linear equation representing each photographed bright line in the plane coordinate system to that of the space coordinate system by the use of the coordinate transformation parameter calculating means and the planar equation calculating means; and (f) bending angle calculating means for calculating a planar equation representing the two bright lines from the linear equations for the two bright lines which have been transformed to the space coordinate system by the coordinate value transforming means, thereby obtaining an angle at which the workpiece is bent.

In the bending angle detector for use in a bending machine according to the second aspect of the invention, slit lights instead of spot lights are used as light beams projected onto an object to be photographed, instead of spot lights. Like the first case, a lattice pattern on the surface of which a number of reference positions are arranged is first moved at a specified pitch in order to form a virtual cubic lattice in space, and then, a plurality of images are obtained by photographing each point of the cubic lattice. From a plurality of images thus obtained, a coordinate transformation parameter, which is used for transforming from the space coordinate system in which each axis of the cubic lattice is set as a reference axis to the plane coordinate system representing an image plane of the photographing means, is obtained. From the positions of at least two bright lines formed in the lattice patterns of the cubic lattice, a planar equation representing each slit light in the space coordinate system is obtained. Thus, a linear equation which represents, in the space coordinate system, a bright line at a desired position can be obtained from the coordinate transformation parameter and the planar equation representing a slit light. Accordingly, linear equations, which respectively represent each of two bright lines formed by projecting at least two slit lights onto the outer faces of the bent workpiece, can be obtained, and from these linear equations, a planar equation representing the two bright lines, that is, an angle at which the workpiece is bent can be obtained.

Preferably, the projector means and photographing means are respectively disposed so as to move in parallel with the bend line of the workpiece. This makes it possible to detect the bending angle at a desired position on the outer surfaces of the bent workpiece, by moving the projector means and the photographing means.

There may be provided a set of projector means and photographing means for each of the two outer faces of the bent workpiece. With this arrangement, the bending angle can be detected on each of the outer faces of the bent workpiece, leading to higher precision detection.

The projector means may be a single projector of which the projecting angle is adjustable, or it may be a plurality of projectors the number of which corresponds to the number of light beams (spot lights or slit lights) projected onto the outer faces of the bent workpiece.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1 to 7 illustrate a first embodiment of the bending angle detector for use in a bending machine according to the invention, wherein;

FIG. 1 is a perspective view of a press brake,

FIG. 2 is an illustration showing the arrangement of a measuring unit in the press brake, FIG. 3 is a block diagram with reference to which an image processing method will be described, FIG. 4 is an illustration with reference to which a measuring method for calibration when performing image processing will be described, FIG. 5 is an illustration with reference to which a concept for measuring the coordinates of bright points in the space coordinate system when performing image processing will be described, FIG. 6 is a flow chart of a bending angle detection process, and FIG. 7 is an illustration showing the relationship between each bright point and an object plane.

FIGS. 8 and 9 illustrate a second embodiment of the bending angle detector for use in a bending machine according to the invention, wherein;

FIG. 8 is a flow chart of a bending angle detection process,

FIG. 9 shows the relationship between each bright line and an object plane.

BEST MODE FOR CARRYING OUT THE INVENTION

Figure 1:
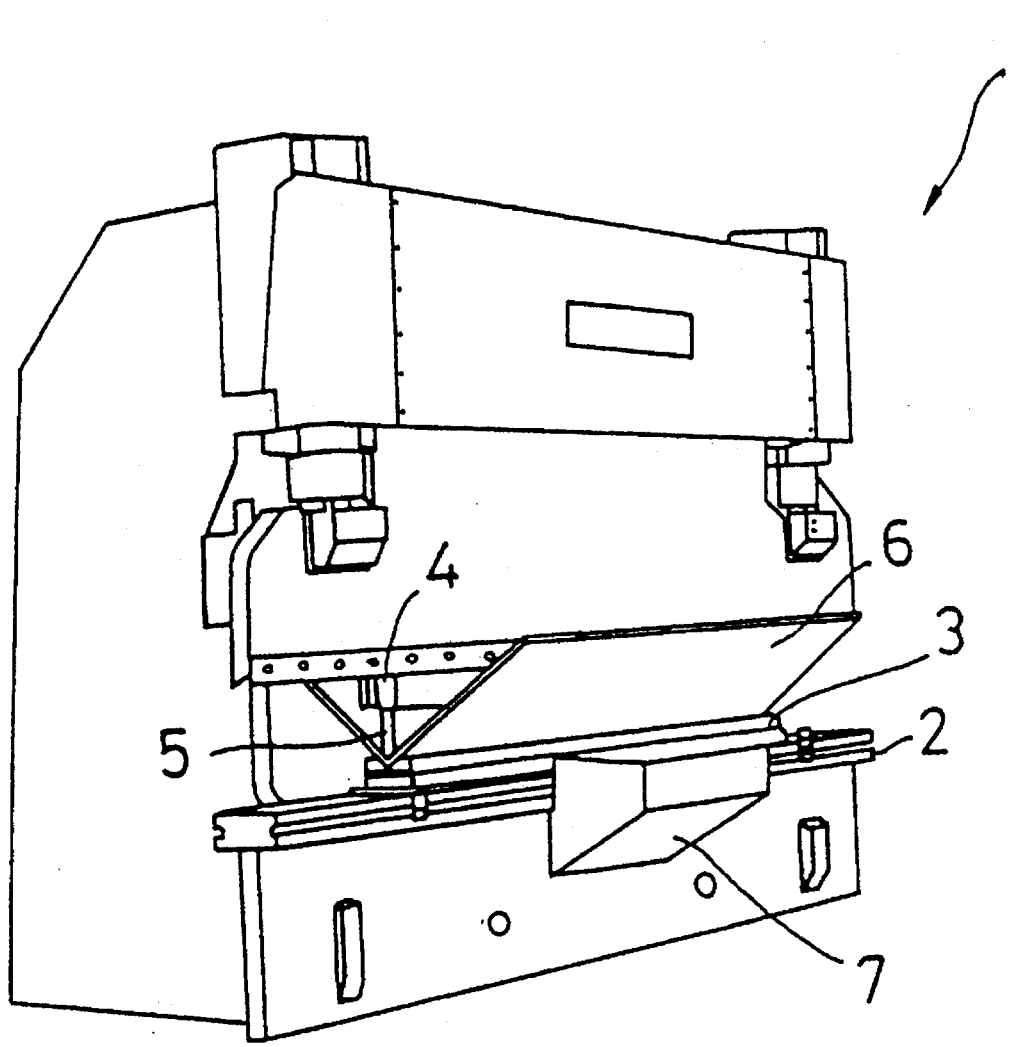

Referring now to the drawings, preferred embodiments of the bending angle detector for use in a bending machine according to the invention will be hereinafter described.

FIRST EMBODIMENT

FIG. 1 shows a press brake i in which a lower bender (die) 3 is supported on a support 2 and an upper bender (punch) 5 is attached to the under part of a ram 4 which is opposite to the lower bender 3 and disposed above the lower bender 3 so as to be freely lifted or lowered. A workpiece 6 made of a metal sheet is inserted between the upper bender 5 and the lower bender 3 and the ram 4 is lowered with the workpiece 6 being placed on the lower bender 3 so that the workpiece 6 is pinched and pressed by the upper bender 5 and the lower bender 3, and bending of the workpiece 6 is accordingly performed.

Figure 2:
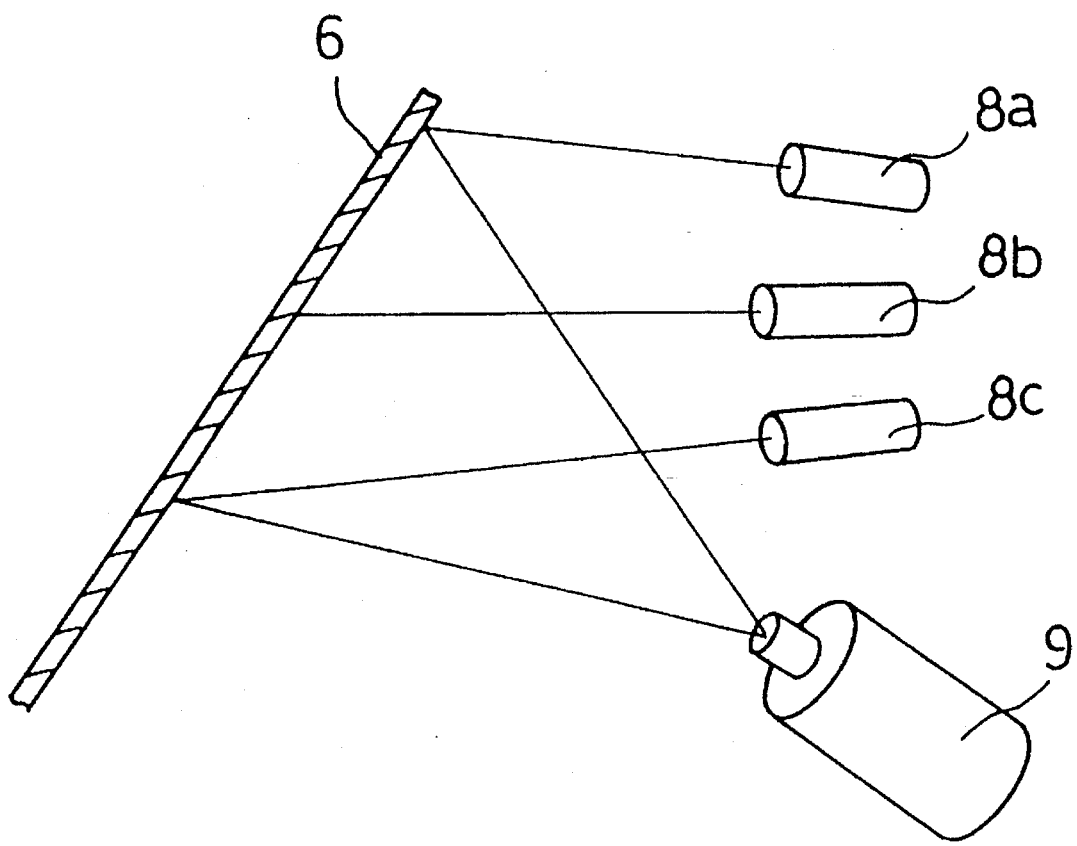
Figure 3:
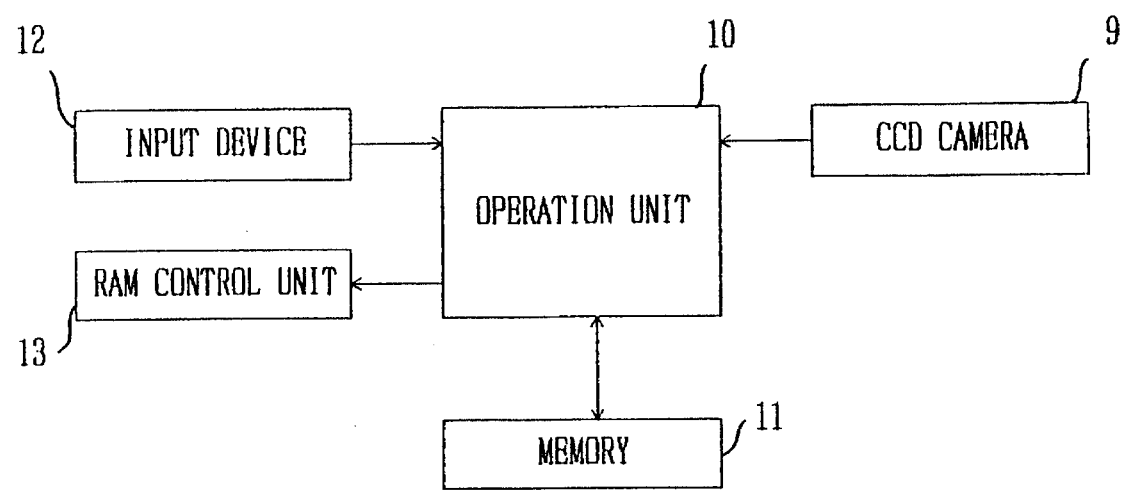

There are provided measuring units 7 in front of and behind the support 2, for detecting a bending angle at which the workpiece 6 is bent (only the front measuring unit is shown in FIG. 1). As shown in FIG. 2, each of the measuring units 7 comprises three projectors 8a, 8b, 8c serving as projector means for projecting spot lights (laser beams) onto the workpiece 6 and a CCD camera 9 serving as photographing means for photographing the bent workpiece 6 on the outer faces of which bright points are formed by the projectors 8a, 8b, 8c. As shown in FIG. 3, an image taken by the CCD camera 9 is sent as image data to a memory 11 through an arithmetic operation unit 10 to be stored in the memory 11. The arithmetic operation unit 10 performs arithmetic operation, adding various conditions input by an input device 12 to the image data, so that the bending angle of the workpiece 6 is obtained. The bending angle obtained by the arithmetic operation is supplied to a ram control unit 13 which controls the bottom dead center of the ram 4, whereby the workpiece 6 is bent at the desired angle.

When three spot lights are projected onto the workpiece 6 from the three projectors 8a, 8b and 8c, three cutting points formed when these spot lights cut the workpiece 6, i.e., three bright points are obtained. By photographing these bright points with the CCD camera 9, the three-dimensional configuration of the workpiece 6 can be represented on an image of two dimensions.

In order to transform the image of workpiece 6 photographed by the CCD camera 9 from a two-dimensional coordinate system to a three-dimensional coordinate system which can express depth, a coordinate transformation parameter for a camera obtained by the following calibration is used in this embodiment.

Figure 4:
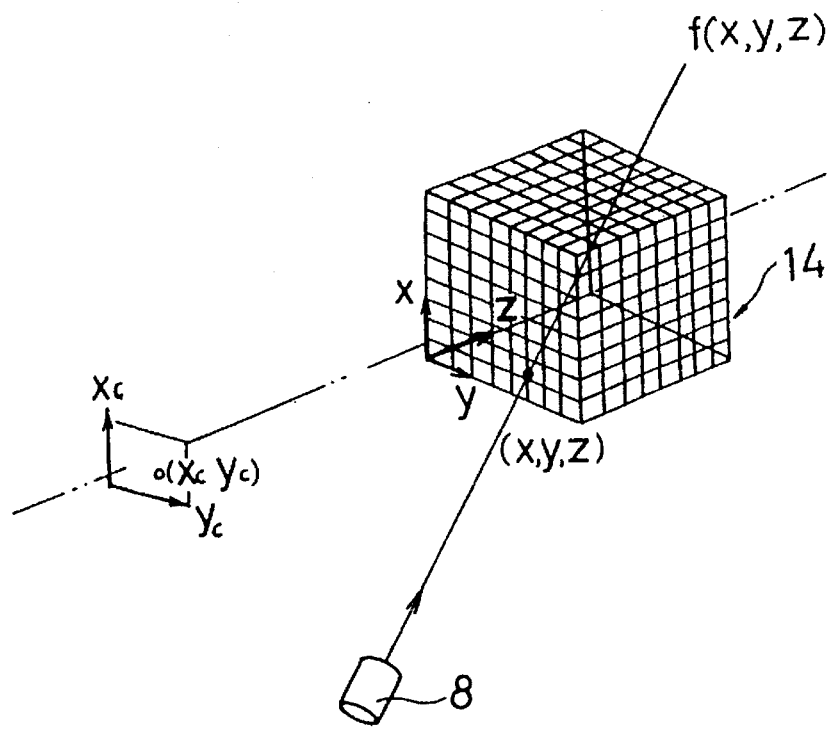

Firstly, a plate (lattice pattern) on which surface a number of reference positions are arranged in the pattern of a lattice is placed at a specified angle to the CCD camera 9. Then, the plate is kept a specified distance away from the CCD camera 9, thereby forming a virtual cubic lattice 14 in space (see FIG. 4). While projecting a spot light onto the cubic lattice 14 by means of the projector, each lattice point of the cubic lattice 14 is photographed by the CCD camera 9, thereby obtaining a plurality of images. From positional data on each point $(x_c, y_c)$ of the cubic lattice 14 represented by the camera coordinate system and positional data on a bright point $(x, y, z)$ formed by the spot light, a coordinate transformation parameter used for transformation from a space coordinate system in which the axes x, y, z of the cubic lattice 14 are set as reference axes to a plane coordinate system representing the image plane of the camera is obtained by arithmetic operation. The coordinate transformation parameter thus obtained is stored in the memory 11.

In this embodiment, a linear equation $f(x, y, z)$ which represents, in the space coordinate system, the spot light projected onto an outer face of the bent workpiece 6, is obtained as a parameter and this equation $f(x, y, z)$ is also stored in the memory 11. The linear equation $f(x, y, z)$ is obtained from the positions of at least two bright points which are formed on the lattice patterns of the cubic lattice by projecting a spot light. The position of each bright point is determined by arithmetic operation using the coordinates of four lattice points enclosing the bright point.

Accordingly, the coordinate transformation parameter and linear equations respectively representing each of three spot lights projected from the three projectors 8a, 8b, 8c are obtained. Then, the coordinates of three bright points, which are formed on the outer faces of the bent workpiece 6 by the three spot lights, in the space coordinate system can be obtained from the coordinates of the bright points in the plane coordinate system which represents the image plane of the camera. After obtaining the coordinates of the three bright points in the space coordinate system, the planar equation representing these three points is determined, whereby the bending angle of the workpiece 6 is detected.

Figure 5:
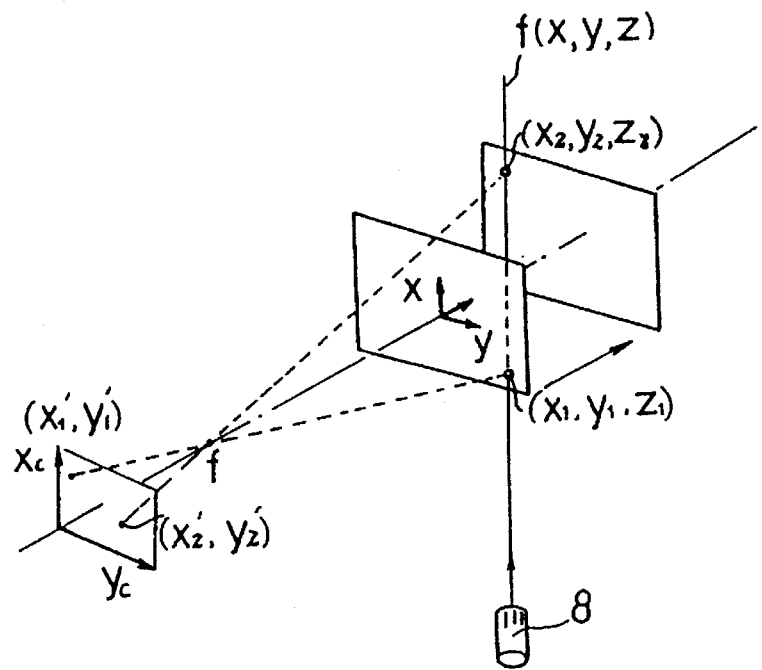
Figure 6:
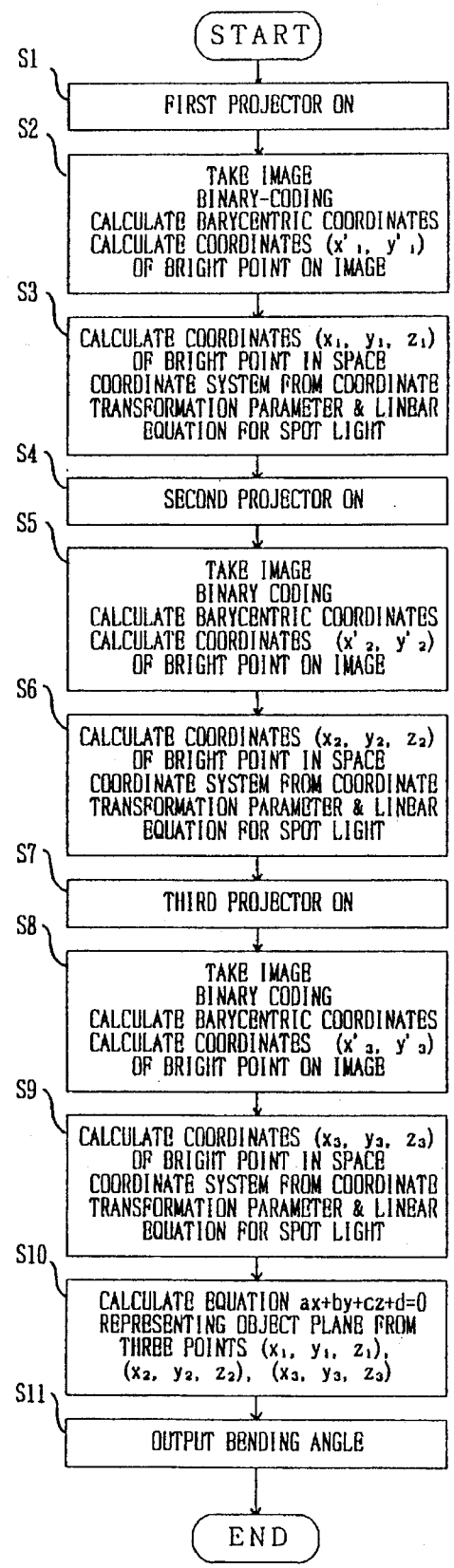

FIG. 5 shows a concept for measuring bright points in the space coordinate system. The bright points $(x_1, y_1, z_1)$, $(x_2, y_2, z_2)$ of a spot light at desired positions in the space coordinate system representing the virtual cubic lattice are unitarily determined by the coordinates $(x'_1, y'_1)$, $(x'_2, y'_2)$ in the camera coordinate system and the linear equation f (x, y, z) which passes through the two bright points $(x_1, y_1, z_1)$, $(x_2, y_2, z_2)$, With reference to the flow chart of FIG. 6, the above-mentioned bending angle detection process of this embodiment will be described.

Step S1: The first projector 8a is switched ON to project a spot light onto an outer face of the bent workpiece 6.

Step S2: The image of a bright point produced by projecting the spot light onto the outer face of the bent workpiece 6 is taken by the CCD camera 9. The image is binary coded and the barycentric coordinates of the image are calculated, thereby obtaining the coordinates $(x'_1, y'_1)$ of the bright point.

Step S3: Using the coordinate transformation parameter and the linear equation representing the spot light which have been obtained by a different routine and stored in the memory 11, the above coordinates $(x'_1, y'_1)$ in the plane coordinate system are transformed to the coordinates $(x_1, y_1, z_1)$ in the space coordinate system.

Step S4: The second projector 8b is switched ON to project a spot light onto an outer face of the bent workpiece 6.

Step S5: The spot light from the second projector 8b produces a bright point and the coordinates $(x'_2, y'_2)$ of this bright point on the image are obtained, like in Step S2.

Step S6: The coordinates $(x'_2, y'_2)$ of the bright point in the plane coordinate system are transformed into the coordinates $(x_2, y_2, z_2)$ in the space coordinate system, like in Step S3.

Step S7: The third projector 8c is switched ON to project a spot light onto an outer face of the bent workpiece 6.

Step S8: The spot light from the third projector 8c produces a bright point and the coordinates $(x'_3, y'_3)$ of this bright point on the image are obtained like in Steps S2 and S5.

Step S9: The coordinates $(x'_3, y'_3)$ of the bright point in the plane coordinate system are transformed into the coordinates $(x_3, y_3, z_3)$ in the space coordinate system, like in Steps S3 and S6.

Figure 7:
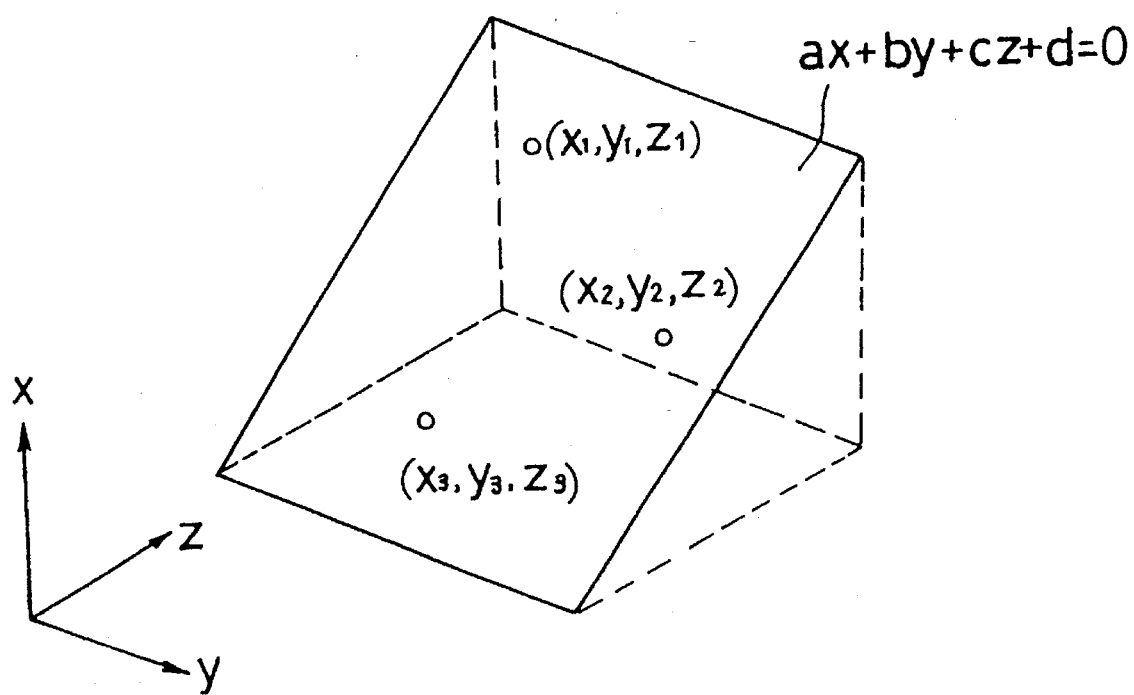

Step S10: From the coordinates $(x_1, y_1, z_1)$, $(x_2, y_2, z_2)$, $(x_3, y_3, z_3)$ of the bright points of the three spot lights in the space coordinate system, which have been calculated in Steps S3, S6 and S9, the planar equation $ax+by+cz+d=0$ representing the object plane including the three bright points is calculated (see FIG. 7).

Step S11: The bending angle of the workpiece 6 is calculated from the planar equation obtained in Step S10 and this bending angle is released as an output to the ram control unit 13.

While the first embodiment is described with a case where the bending angle of a workpiece is detected by projecting three spot lights onto the workpiece, it is readily apparent that the number of spot lights to be projected may be four or more. By increasing the number of bright points to be measured, it becomes possible to use "the method of least squares", which leads to an improvement in the measuring accuracy.

SECOND EMBODIMENT

Figure 10:
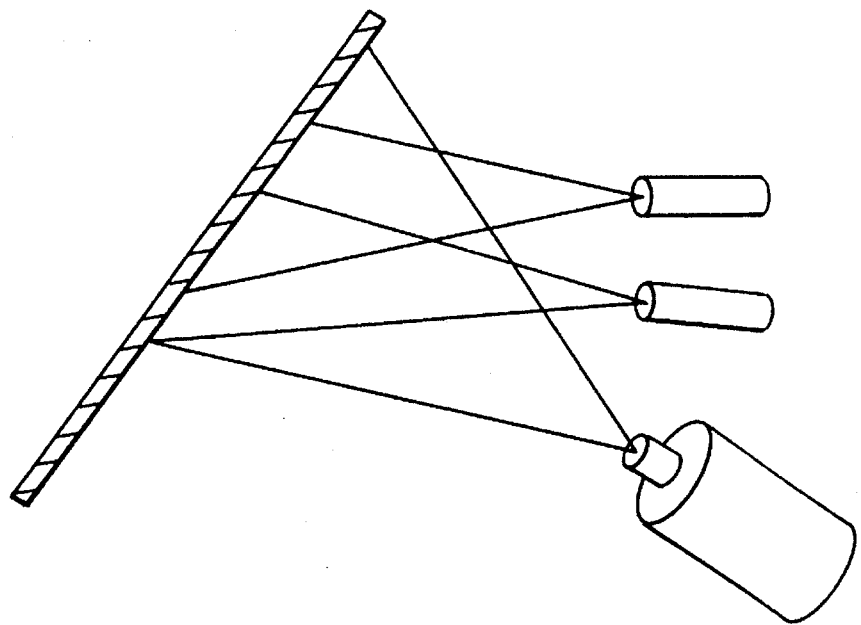
FIG. 10 is an illustration showing the arrangement of a measurement unit using two slit lights.

Another bending angle detector will be described according to a second embodiment shown in FIG. 10. In the second embodiment, two slit lights are projected instead of three spot lights such as used in the first embodiment in order to detect a bending angle. In the description of the bending angle detector of the second embodiment, the parts substantially similar to those of the first embodiment are indicated by the same numerals and the description of them is omitted.

In the case of using two slit lights for detecting a bending angle like in this embodiment, instead of linear equations as obtained in the first embodiment, planar equations, which represent in the space coordinate system the slit lights projected on the outer faces of the bent workpiece 6, are obtained as parameters. After the coordinate transformation parameter and the planar equations representing two slit lights have been determined, the equations in the plane coordinate system representing the image plane of the camera, which equations represent bright lines formed by the slit lights on the outer faces of the bent workpiece 6, are transformed into linear equations in the space coordinate system. From the linear equations representing the two bright lines in the space coordinate system, a plane including these lines is determined, whereby a bending angle at which the workpiece 6 is bent can be detected.

Figure 8:
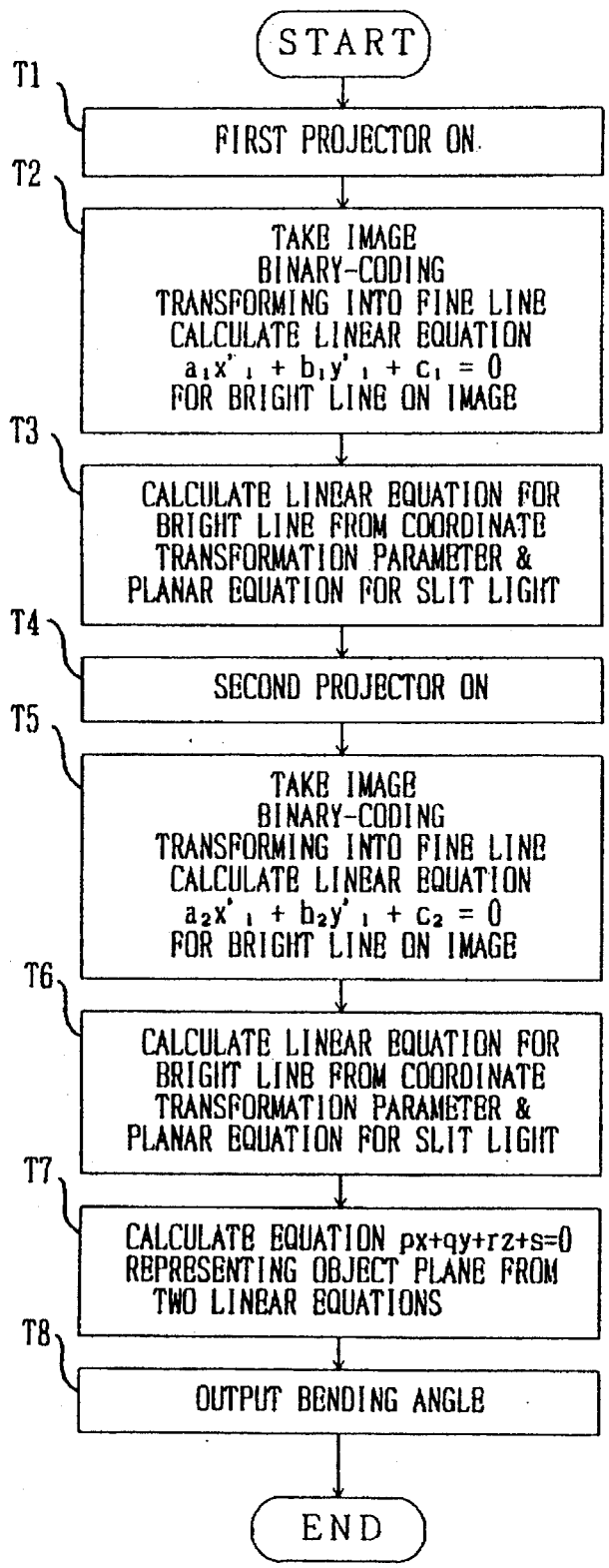

With reference to the flow chart of FIG. 8, a bending angle detection process in which slit lights are used will be described.

Step T1: The first projector is switched ON to project a slit light onto an outer face of the bent workpiece 6.

Step T2: The image of a bright line produced by projecting a slit light onto the outer face of the bent workpiece 6 is taken by the CCD camera 9. The image is binary-coded and transformed into a fine line. Then, the linear equation $a_1x'_1+b_1y'_1+c_1=0$ presenting the bright line on the image is obtained.

Step T3: Using the coordinate transformation parameter and the planar equation for the slit light which have been obtained by a different routine and stored in the memory 11, a linear equation representing the bright line in the space coordinate system is calculated.

Step T4: The second projector is switched ON to project a slit light onto an outer face of the bent workpiece 6.

Step T5: The linear equation $a_2x'_1+b_2y'_1+c_2=0$ representing a bright line on the image, which bright line has been produced by the slit light from the second projector, is obtained, like in Step T2.

Step T6: A linear equation representing the bright line in the space coordinate system is calculated, like in Step T3.

Figure 9:
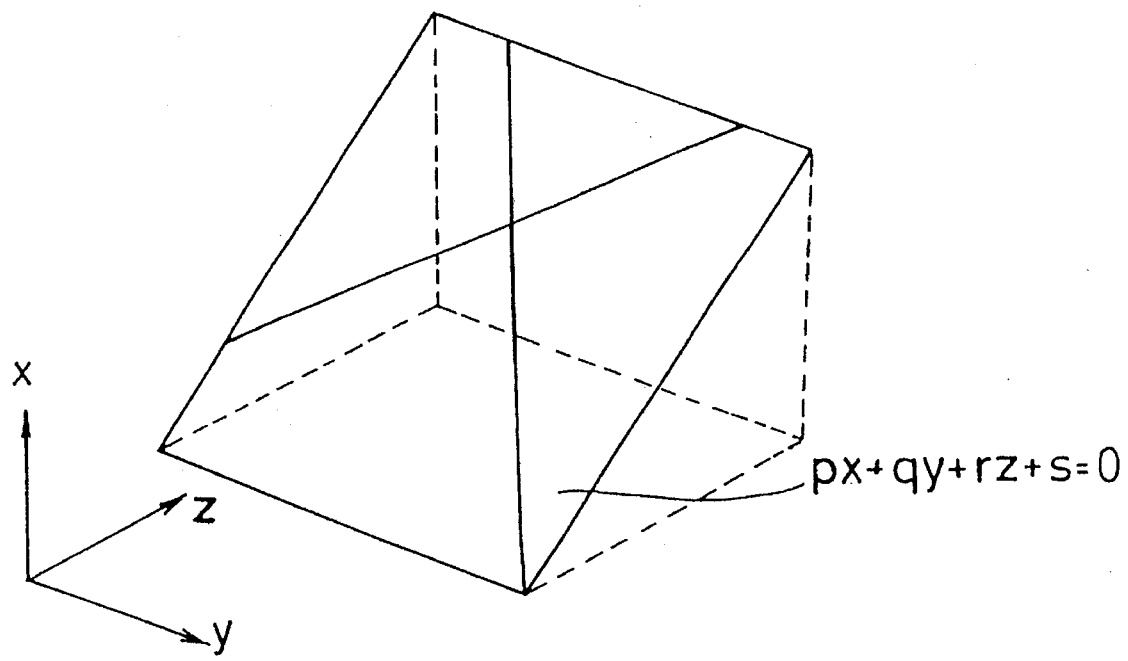

Step T7: Using the linear equations which respectively represent the bright lines produced by two slit lights and which have been calculated in Steps T3 and T6, the planar equation $px+qy+rz+s=0$ representing the object plane including the two lines is calculated (see FIG. 9).

Step T8: The bending angle of the workpiece 6 is calculated from the planar equation obtained in Step T7, and then this bending angle is released as an output to the ram control unit 13.

It is apparent that three or more slit lights may be also used in this embodiment, thereby achieving an improvement in the measuring accuracy.

Figure 11:
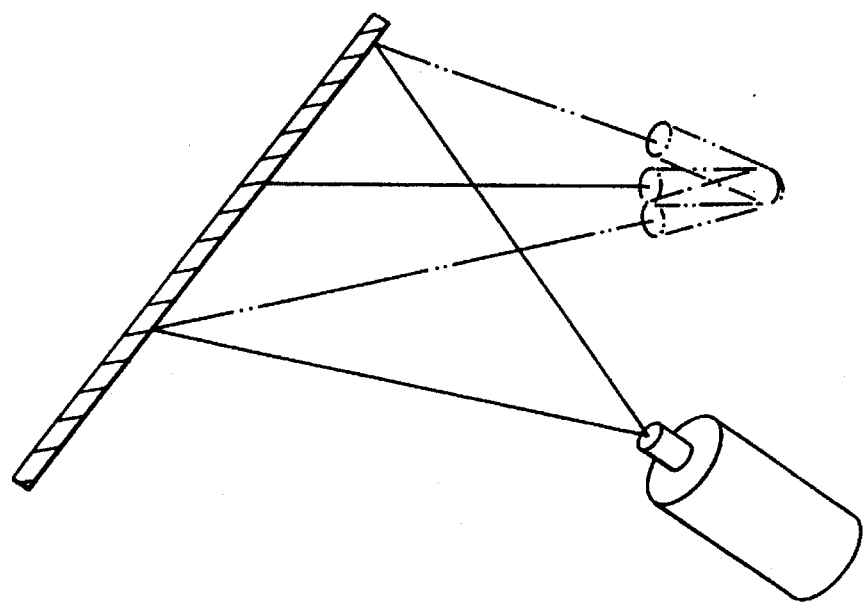
FIG. 11 is an illustration showing an adjustable projector.

Although a plurality of projectors are employed for projecting spot lights or slit lights in the foregoing embodiments, there could be provided a single projector of which projecting angle is adjustable such as shown in FIG. 11.

The measuring units (projectors and CCD camera) in the foregoing embodiments may be designed to scan in parallel with the bend line of the workpiece. This enables it to detect a bending angle at a desired position even if a long workpiece is measured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

In the bending angle detector for use in a bending machine according to the invention, the bending angle of a workpiece is detected through image processing in which the position of a workpiece is represented by a virtual space coordinate system. Therefore, the bending angle detector can be made as "the non-contact type detector" which offers excellent durability. When installed in a bending machine, mounting accuracy is not required. Further, there is no need to provide geometric data such as the shape of bender and the bending angle of a workpiece can be detected with high accuracy without being affected by the material of the workpiece.

That which is claimed is:

1. A bending angle detector for use in a bending machine in which a sheet-like workpiece is bent at a specified angle by means of an upper bender and a lower bender, the detector comprising:

(a) projector means for projecting spot lights onto an object to be photographed forming bright points on a surface of the object;

(b) photographing means for photographing the object to be photographed on the surface of which bright points are formed by the projector means;

(c) coordinate transformation parameter calculating means a) for forming a virtual cubic lattice in space by moving, at a specified pitch, a lattice pattern which is formed by arranging a number of reference positions in the lattice pattern of a cubic lattice on the surface of the object to be photographed, and b) for calculating a coordinate transformation parameter from a plurality of images obtained by photographing each point of the cubic lattice, the coordinate transformation parameter being used for transformation between a space coordinate system in which each axis of the cubic lattice is set as a reference axis and a plane coordinate system which represents an image plane of the photographing means;

(d) linear equation calculating means for calculating a linear equation representing, in the space coordinate system, each spot light projected by the projector means from positions of at least two bright points formed in the lattice patterns of the cubic lattice;

(e) coordinate value transforming means a) for photographing a bent workpiece on outer faces of which at least three bright points are formed by projecting at least three spot lights thereon by means of the projector means and b) for transforming coordinate values of each photographed bright point in the plane coordinate system to those of the space coordinate system by the use of the coordinate transformation parameter calculating means and the linear equation calculating means; and (f) bending angle calculating means for calculating a planar equation representing the three bright points from the coordinate values of the at least three bright points which have been transformed to the space coordinate system by the coordinate value transforming means, herein containing an angle at which the workpiece is bent.

2. A bending angle detector for use in a bending machine in which a sheet-like workpiece is bent at a specified angle by means of an upper bender and a lower bender, the detector comprising:

(a) projector means for projecting slit lights onto an object to be photographed therein forming bright lines on a surface of the object;

(b) photographing means for photographing the object to be photographed on the surface of which bright lines are formed by the projector means;

(c) coordinate transformation parameter calculating means a) for forming a virtual cubic lattice in space by moving, at a specified pitch, a lattice pattern which is formed by arranging a number of reference positions in the lattice pattern of a cubic lattice on the surface of the object to be photographed, and b) for calculating a coordinate transformation parameter from a plurality of images obtained by photographing each point of the cubic lattice, the coordinate transformation parameter being used for transformation between a space coordinate system in which each axis of the cubic lattice is set as a reference axis and a plane coordinate system which represents an image plane of the photographing means;

(d) planar equation calculating means for calculating a planar equation representing, in the space coordinate system, each slit light projected by the projector means from positions of at least two bright lines formed in the lattice patterns of the cubic lattice;

(e) coordinate value transforming means a) for photographing a bent workpiece on outer faces of which at least two bright lines are formed by projecting at least two spot lights thereon by means of the projector means and b) for transforming a linear equation representing each photographed bright line in the plane coordinate system to that of the space coordinate system by use of the coordinate transformation parameter calculating means and the planar equation calculating means; and (f) bending angle calculating means for calculating a planar equation representing the two bright lines from the linear equations for the two bright lines which have been transformed to the space coordinate system by the coordinate value transforming means, therein obtaining an angle at which the workpiece is bent.

3. The bending angle detector for use in a bending machine as set forth in claim 1 or 2, wherein the projector means and the photographing means are respectively disposed so as to move in parallel with a bend line of the workpiece.

4. The bending angle detector for use in a bending machine as set forth in claim 1 or 2, wherein the projector means and the photographing means are both provided for each of two outer faces of the bent workpiece.

5. The bending angle detector for use in a bending machine as set forth in claim 1 or 2, wherein the projector means is a single projector of which a projecting angle is adjustable.

6. The bending angle detector for use in a bending machine as set forth in claim 1 or 2 wherein the projector means is a plurality of projectors a number of which corresponds to a number of light beams projected onto the outer faces of the bent workpiece.

* * * * *